Figure 1:
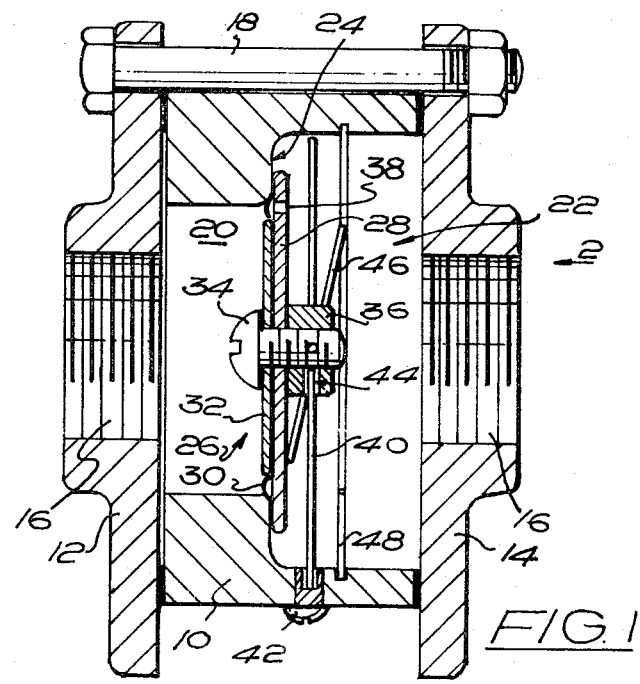

United States Patent [19]
Davison

[11] 3,783,894
[45] Jan. 8, 1974

[54] NON-RETURN VALVES
[75] Inventor: George Robert Davison, Chesterfield, England
[73] Assignee: The Bryan Donkin Company Limited, Chesterfield, Derbyshire, England
[22] Filed: Nov. 21, 1972
[21] Appl. No.: 308,457

[30] Foreign Application Priority Data
Nov. 26, 1971 Great Britain............... 55,074/71

[52] U.S. Cl............. 137/535, 137/533.17, 251/175
[51] Int. Cl............................................ F16k 15/02
[58] Field of Search.................... 137/528, 535, 540, 137/533.17

[56] References Cited
UNITED STATES PATENTS
2,492,740  12/1949  Garratt ........................... 137/535 X Primary Examiner—Robert G. Nilson
Attorney—Browdy and Neimark

[57] ABSTRACT

A non-return valve having a closure member disposed in a casing and supported on pins loosely located at their outer ends in the casing wall so that it can move freely towards or away from a valve seat.

8 Claims, 4 Drawing Figures

NON-RETURN VALVES

The invention relates to non-return valves and has for its object to provide an improvement therein.

Non-return valves are normally provided in gas supply pipe lines so that if there should be a blow back or explosion at the downstream end of the supply line it will be isolated by the closure of the valve. It is therefore essential that such a valve is quick acting. It is also essential that such a valve should close quickly and effectively even after long use in an inoperative, that is to say open, condition. Such a valve should also be of compact shape and size and be capable of being produced at the lowest possible cost; hence it should be of simple construction. The present invention seeks to at least alleviate the difficulties which have previously been found in providing such a valve with the above desiderata in mind.

According to the invention, a non-return valve is provided with a casing and with a closure member supported on a plurality of pins loosely located at their outer ends in the wall of the casing and loosely located at their inner ends in apertures in a member located concentrically of the closure member whereby the closure member is able to move towards and against a valve seat formed within the casing in a virtually friction free manner. The pins will preferably extend radially of the axis of the closure member. When the valve is to be used in a horizontal or near horizontal pipe run, a lowermost one of the pins will preferably be vertically disposed and resilient means will preferably be provided to counter the tendency for the weight of the closure member to tilt it about the upper end of said lowermost pin. Means for locating the outer ends of the pins in the wall of the casing may be constituted by hollow screws extending through the wall of the casing. On the other hand, where the casing is formed in two halves, the joint face of at least one of said halves may be grooved to form a location for the ends of the pins. The closure member will preferably include a valve disc having a flexible sealing element clamped on its operative face, means being provided whereby a pressure of gas from what is normally the downstream side of the closure member can gain access to a space between the valve disc and said sealing element. The flexible sealing element will preferably be clamped to the operative face of the valve disc by means of a clamping plate somewhat smaller than the diameter of a flow passage adjoining the seating surface so that the space to which gas can gain access is an annular space. The means whereby the gas can gain access to said space may be a hole or a plurality of holes in the valve disc.

Figure 2:
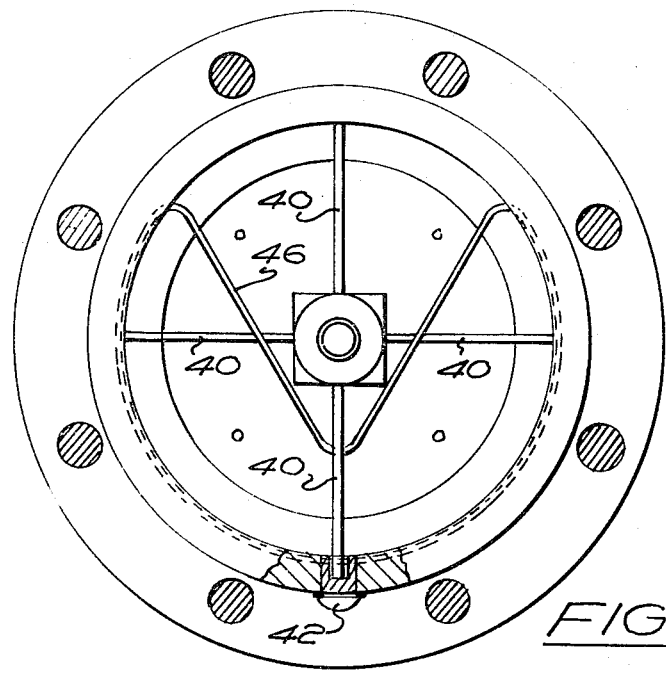
Figure 3:
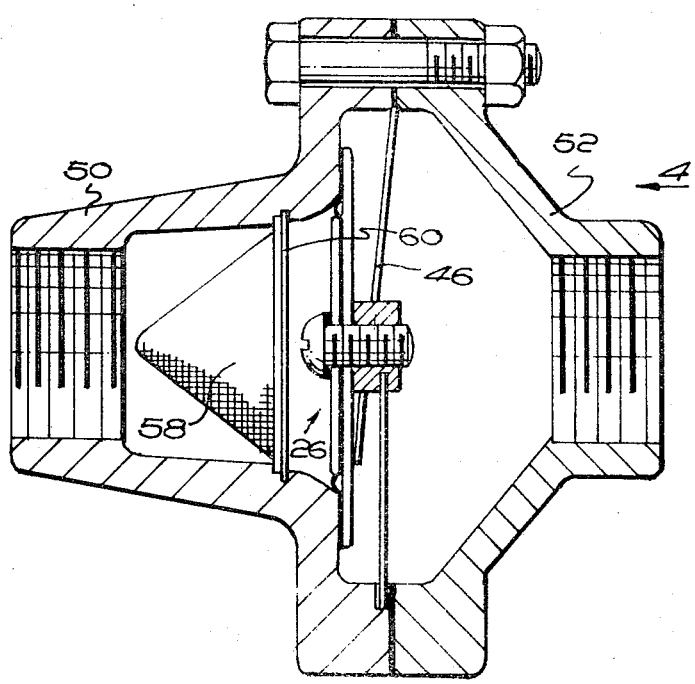
Figure 4:
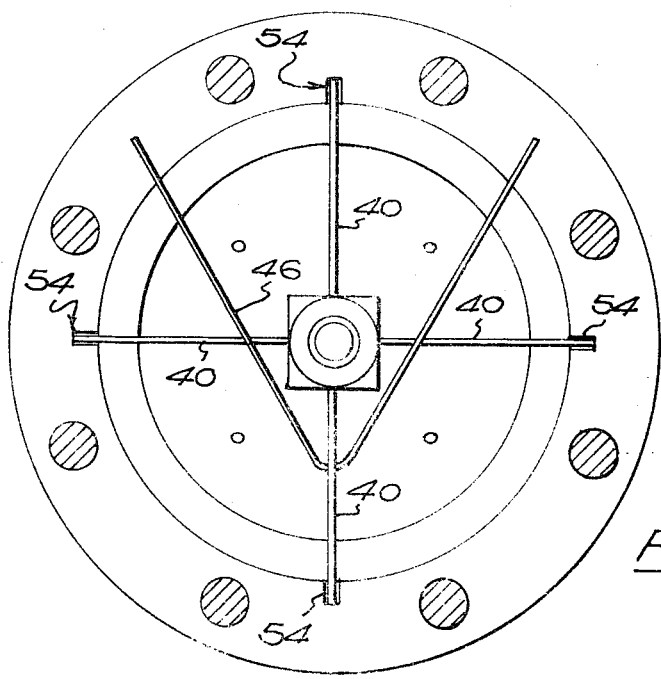

In order that the invention may be fully understood and readily carried into effect, the same will now be described, by way of example only, with reference to the accompanying drawings, of which:

FIG. 1 is a longitudinal section through a non-return valve embodying the invention, FIG. 2 is a view looking in the direction of arrow 2 with an end cap removed, FIG. 3 is a view similar to FIG. 1 of a modified and improved construction of valve, and FIG. 4 is a view thereof in the direction of arrow 4 with a casing half removed.

Referring now to FIGS. 1 and 2, the non-return valve there illustrated is provided with a casing constituted by a central body part 10 and respective end plates 12 and 14 which have screwthreaded bores 16 for the connection of lengths of gas supply pipe. The end plates are secured in position at the opposite ends of the body part by a plurality of bolts 18 which extend through aligned holes in radially projecting flanges of the end plates.

The body part is provided with a flow passage 20 and with a somewhat larger cavity 22 at one end. An annular shoulder 24 within the cavity constitutes a seating surface for a closure member generally indicated 26.

The closure member 26 comprises a valve disc 28 which has a flexible sealing element 30 clamped on its front face by means of a clamping plate 32 which, as shown in FIG. 1, is almost as large as the diameter of the flow passage 20. The clamping plate is secured in position by a screw 34 which extends through said plate, through the sealing element 30 and through the valve disc. Said screw is provided with a square nut 36 at the rear face of the disc. A plurality of holes 38 are provided in the valve disc and open into an annular space between the front face of said disc and the flexible sealing element, said annular space being defined, as shown, by the diameter of the clamping plate and the diameter of the flow passage 20. The arrangement is such that when the valve is closed to prevent back flow of gas, the pressure of gas from the normally downstream side of the closure member is able to act within said annular space to mould the flexible sealing element to the shape of the seating surface and to the rounded configuration of the transition between said seating surface and the wall of the flow passage.

The closure member is supported on four pins 40 which are loosely located at their outer ends by means of hollow screws 42 extending through the wall of the body part 10. The inner ends of said pins are loosely located in apertures formed by holes 44 which have been drilled in the nut 36. The pins thus extend radially of the axis of the closure member and one of said pins is vertically disposed.

It will be understood that, by virtue of the location of the closure member in the manner just described, it is able to move towards and against the valve seating surface in a virtually friction free manner. Its movement away from said seating surface during normal operation is limited by the periphery of the valve disc contacting the pins 40.

It will be observed that the centre of gravity of the closure member is located in the region of the centre of the valve disc 28, that is to say, somewhat offset from the upper end of the lowermost pin on which its weight is supported. This produced a "couple" tending to tilt the closure member towards the valve seating surface. Resilient means, constituted by a spring 46, are provided to counter this tendency so that the closure member is maintained substantially in alignment with the seating surface. The opposite ends of said spring are located as shown in a groove 48 which has been machined in the wall of the cavity 22 and an intermediate portion of said spring acts against the rear face of the valve disc some distance below its centre. It has been arranged that the force with which the spring acts against the valve disc and the distance beneath the axis of the disc at which it acts produces a "couple" substantially equal and opposite to the "couple" produced by the weight of the closure member.

It has been found that the mounting of the closure member in the friction free manner described and the balancing of the closure member in the manner just described has resulted in a non-return valve which is remarkably quick acting and which has been effective to guard against the danger of a blow back due to an explosion at the downstream side of the valve. In combination with the construction of the closure member described above, it is thought that these features have resulted in a non-return valve which is not only quick acting but one which will seal very effectively even after long use in an inoperative, that is to say permanently open condition. However, it will be understood that the construction of the closure member itself may be varied in numerous ways without departing from the scope of the invention. It may not always be desired to allow access of gas from what is normally the downstream side of the valve to a space between the valve disc and the sealing element. On the other hand such access may be allowed by means other than a hole or a series of holes in the valve disc; for example by surface irregularities of the sealing element or of the valve disc, or both, or by radial grooves machined or pressed in the valve disc.

Referring now to FIGS. 3 and 4, these illustrate a different construction of non-return valve with is nonetheless basically similar to that described above. The construction of the closure member 26 is exactly the same as that described above but the casing is formed in two halves 50, 52 and the joint fact of the casing half 50 is grooved at 54 to form a location for the ends of the pins 40. It will also be seen that the ends of the spring 46 have been suitably modified so that they can be nipped between the joint facts of the casing halves. In addition, a filter element 58 of conical form has been located in the casing half 50, that is to say on what is normally the upstream side of the closure element, by means of a cir-clip 60.

Various other modifications may be made without departing from the scope of the invention. For example, if the non-return valve is to be used in a vertical pipe run it will not be necessary to balance the closure member in the manner described above because its own weight will not produce a "couple" tending to tilt it. However, a pair of the springs 46, acting one on each side of the valve disc, may in this case be provided to urge the closure member towards the seating surface. It will be understood that the required radial width of the space between the periphery of the clamping plate and the wall of the flow passage in the closure member illustrated may be determined by trial and experiment and may depend on the thickness of the flexible sealing element and the pressures to which the closure member is likely to be subjected. It may also be found that leakage of fluid between plain surfaces of the sealing element and valve disc may be depended upon to produce the desired "ballooning" effect in the sealing element. On the other hand it will be understood that the valve may have any other suitable form of closure member.

What I claim and desire to secure by Letters Patent is:

1. A non-return valve comprising a casing; a valve seat formed within said casing; a closure member disposed within said casing for movement towards and away from said valve seat; and means for supporting said closure member within said casing for movement towards and away from the valve seat in a virtually friction free manner, said means comprising a plurality of pins loosely located at their inner ends in apertures in a member located concentrically of the closure member and loosely located at their outer ends in the wall of the casing.

2. A non-return valve according to claim 1, in which the pins extend radially of the axis of the closure member.

3. A non-return valve according to claim 2, in which, when the valve is to be used in a horizontal pipe run, a lowermost one of the pins is vertically disposed and resilient means are provided to counter the tendency for the weight of the closure member to tilt it about the upper end of said lowermost pin.

4. A non-return valve according to claim 1, in which means for locating the outer ends of the pins in the wall of the casing are constituted by hollow screws extending through the wall of the casing.

5. A non-return valve according to claim 1, in which the casing is formed in two halves and the joint face of at least one of said halves is grooved to form a location for the ends of the pins in the wall of the casing.

6. A non-return valve according to claim 1, in which the closure member includes a disc having a flexible sealing element clamped on its operative face, means being provided whereby a pressure of gas from what is normally the downstream side of the closure member can gain access to a space between the valve disc and said sealing element.

7. A non-return valve according to claim 6, in which the flexible sealing element is clamped to the operative face of the valve disc by means of a clamping plate somewhat smaller than the diameter of a flow passage adjoining the seating surface so that the space to which gas can gain access is an annular space.

8. A non-return valve according to claim 6, in which the means whereby the gas can gain access to the space between the valve disc and the sealing element is a hole or a plurality of holes in the valve disc.

* * * * *